United States Patent [19]

Vermesse

[11] Patent Number: 4,928,249

[45] Date of Patent: May 22, 1990

[54] OPERATING SYSTEM FOR AN ELECTRONIC FRANKING MACHINE

[75] Inventor: Bernard Vermesse, l'Hay-les-Roses, France

[73] Assignee: Societe Anonyme dite : SMH Alcatel, Paris, France

[21] Appl. No.: 161,948

[22] Filed: Feb. 29, 1988

[30] Foreign Application Priority Data

Feb. 27, 1987 [FR] France .................. 87 02667

[51] Int. Cl.$^5$ .............................................. G07B 17/00
[52] U.S. Cl. .................... 364/518; 364/146; 364/464.02
[58] Field of Search ................ 340/716, 726; 364/464.02, 518, 523, 146, 192

[56] References Cited

U.S. PATENT DOCUMENTS

| | | | |
|---|---|---|---|
| 3,943,335 | 3/1976 | Kinker | 235/379 |
| 4,093,999 | 6/1978 | Fuller | 364/900 |
| 4,134,537 | 1/1979 | Glaser | 235/379 |
| 4,135,662 | 1/1979 | Dlugos | 364/466 X |
| 4,301,507 | 11/1981 | Soderberg et al. | 364/900 X |
| 4,319,336 | 3/1982 | Anderson et al. | 364/900 |
| 4,377,214 | 3/1983 | Hansen et al. | 364/464.03 X |
| 4,381,505 | 4/1983 | Dion | 340/756 |
| 4,398,819 | 8/1983 | Schron | 340/716 X |
| 4,417,322 | 11/1983 | Berry et al. | 364/900 |
| 4,484,304 | 11/1984 | Anderson et al. | 364/900 |
| 4,568,072 | 2/1986 | Piotroski | 364/146 X |
| 4,577,283 | 3/1986 | Soderberg et al. | 364/466 X |
| 4,823,283 | 4/1989 | Diehm et al. | 364/146 X |
| 4,835,700 | 5/1989 | Tanaka et al. | 364/192 X |

FOREIGN PATENT DOCUMENTS

| | | |
|---|---|---|
| 0133344 | 2/1985 | European Pat. Off. . |
| 0147936 | 7/1985 | European Pat. Off. . |
| 2130967 | 6/1984 | United Kingdom . |

*Primary Examiner*—Parshotam S. Lall
*Assistant Examiner*—Edward R. Cosimano
*Attorney, Agent, or Firm*—Sughrue, Mion, Zinn, Macpeak & Seas

[57] ABSTRACT

The machine comprises a 16-key keyboard (1), an alphanumeric display (2), a calendar clock (3), a microprocessor (4), a program memory (5), a text memory (6), and a working memory (7), interconnected by a bus (B). A first set of messages enables normal franking operations to be performed, and a second set of messages which are accessible by means of a menu key (M) on the keyboard enable special operations to be performed. The messages are stored in the text memory, with each message being constituted by screens each of which has the same capacity as the display. Each screen is transferred from the text memory to the working memory prior to being displayed. Each message is controlled by the microprocessor which runs a program relating to each message. All of the programs are stored in the program memory.

12 Claims, 12 Drawing Sheets

OPERATING SYSTEM FOR AN ELECTRONIC FRANKING MACHINE

This invention relates to copending:

U.S. application Ser. No. 161,946, filed Feb. 29, 1988, entitled "Electronic Franking Machine With Operating Mode Selection" by the same inventor and assigned to the common assignee;

U.S. application Ser. No. 161,947, filed Feb. 29, 1988, entitled "Franking Machine Including an Alarm" by the same inventor and assigned to the common assignee; and U.S. application Ser. No. 161,949, filed Feb. 29, 1988, entitled "An Electronic Franking Machine Including Franking Limit Values" by the same inventor and assigned to the common assignee.

BACKGROUND OF THE INVENTION

A franking machine is fitted with data input means generally constituted by a keyboard and a display means commonly referred to as a "display". The user keys in the postage value of a stamp to be printed via the keyboard and the digits keyed in appear in succession in the display, thereby enabling the user to check they are keyed in properly. In addition to its function of checking keying, the display performs two other functions which are:

an alarm function for signalling faults and consisting, for example, in indicating to a user that the machine's credit has been used up (for prepayment type machines) or that the machine has locked up after sensing a fault; this function is generally performed by indicator lamps; and a function of displaying the machine's meter which accumulates the total value of franking performed since the machine was put into service. In normal operation, the state of the meter is permanently displayed so as to enable simple checks on consumption to be performed. In particular, in socalled "post payment" mode, the state of this counter is copied every day onto a monthly deposit sheet.

In order to provide such a display, most franking machines are equipped with a system for displaying characters in the form of seven segments. This well known technique is capable of properly displaying all digits and a certain number of letters or symbols which are more or less well represented.

In order to assist the user in obtaining better management of franking expenditure, for example by splitting said expenditure between a plurality of accounts, it is important for the franking machine to be equipped with auxiliary meters. These meters are made available to the user and serve to accumulate the total number or the total value of franking operations performed in a given period of time. In order to make use of the auxiliary meters, it is necessary for the user to be able, with respect to each meter taken individually, to specify the meter, to start it, to stop it, to reset it to zero, and to display it. These new features are made available by extending the capabilities of the keyboard, either by fitting it with additional keys or else by authorizing simultaneous action on two or three existing keys. For example, in a machine having two auxiliary meters, e.g. a "Subtotal" meter and a "Piece Count" meter, access is given to these meters by two additional keys. Depressing one of these keys causes the state of the selected meter to appear on the display. In order to reset a selected one of the auxiliary meters to zero, a third key is necessary. Sometimes, in order to avoid providing additional keys, the auxiliary meters are selected and reset to zero by acting simultaneously on two keys: for example "1" and "star" to select the "Subtotal" meter, and "0" and "star" operated simultaneously to reset a previously selected "Subtotal" to zero.

If instead of providing two auxiliary meters, it is desired to offer several auxiliary meters to the user, it then becomes necessary either to greatly increase the number of keys, or else to generalize the technique of double or triple key-presses, in which case it becomes necessary to accompany the machine with a code sheet. The user must then constantly refer to the code sheet in the machine's operating manual in order to select, at any given instant, a particular one of its numerous auxiliary meters. Further, it becomes necessary to provide for an increase in display capacity, for example by providing an additional indicator lamp which switches on whenever the state of an auxiliary meter is being displayed, plus at least two digits specifying the number of the meter.

The above-outlined drawbacks become worse if additional functions are added, for example: displaying the date and the time; displaying out-of-credit; providing a large number of auxiliary meters; and stopping or resetting or starting an auxiliary meter. These additional functions require the use of additional keys and the keyboard becomes complicated to use, inconvenient, confusing for the operator, and requires a certain amount of operator training time.

Preferred embodiments of the invention remedy these drawbacks by making it possible to provide additional functions in a franking machine while using as few keys as possible. They also make it possible to subsequently add new functions without changing the number of keys used.

Preferred embodiments of the invention also guide the operator by messages expressed in the clear in the operator's language, so that making use of the machine's potential does not require reference to a code sheet, thereby avoiding loss of time and minimizing the amount of operator training that is necessary.

SUMMARY OF THE INVENTION

The present invention provides a franking machine comprising a keyboard including ten digit keys, a display, a calendar clock, a microprocessor, a program memory, a text memory, and a working memory interconnected by a bus, the franking machine being characterized by the fact that the display is suitable for displaying a text of L lines of N alphanumeric characters, that the keyboard further includes an Enter key, a Cancel key, a Star key, and a Menu key, that a first set of messages for normal franking operations and a second set of messages for special operations are stored in the text memory, that the second set of messages is accessible by means of the Menu key, that each message in the first and second sets of messages is split into screens, each comprising a number L of lines and N of alphanumeric characters equal to the number L of lines and N of characters that can be displayed by the display, with the screens of a message being displayed in succession, that each screen is fully displayed on the display after being transferred from the text memory into the working memory, and that the program memory contains as many programs as there are messages, with each program relating to a message, with the running of a program enabling a message to be displayed, the first set of messages guiding an operator by indicating the next operation to be performed until a franking operation is achieved, and with the second set of messages guiding the operator in performing any special operation by means of messages each of which consists in a sequence of options which, on being selected, lead to corresponding other messages, and so on until the special operation is achieved.

The invention also provides a franking machine in which the first set of messages includes a franking message or menu, a message for keying in the franking value, and a message indicating a confirmed stamp value, and in which the franking message or menu appears after a franking operation or after the Cancel key has been depressed.

The invention also provides a franking machine in which the second set of messages includes a beginning-of-menu message which appears when the operator presses the Menu key, said message including options each of which corresponds to a message, with each option being identified by a digit corresponding to one of the keys of the keyboard, and in which the messages corresponding to the options include "machine state" and "auxiliary meters", with the "auxiliary meters" message including a first option corresponding to an auxiliary meter select message, and second, third, and fourth options corresponding to messages confirming a selected state for the previously selected auxiliary meter, said states being reset to zero, stop, or start, with the selected state being displayed in a selected state confirmation message, and with the selected meter being put into the selected state after said selected state has been confirmed.

The invention is applicable to an electronic franking machine fitted with a calendar clock and with print means that may be mechanical, ink jet, thermal, or of any other known type, with the machine serving to print on envelopes or on labels.

In accordance with the invention, the machine is fitted with 20 pairs of meters made available to the operator, with each pair of meters comprising a money meter and a piece count meter; the machine is also fitted with a 16-key keyboard having 10 digit keys, thereby enabling the operator of the franking machine either to perform normal franking operations or else to perform special operations which are made available via a special key of the keyboard. The machine is also equipped with a display suitable for displaying text in the form of a limited number of lines with each line having a limited number of characters. The term "character" covers a digit, a letter, a symbol, or even a space, with the display being of the alphanumeric type or of the graphic type. Normal franking operations and special operations are constituted by messages split up into screens, with each screen comprising the same number of characters as the maximum capacity of the display, which number is equal to the product of the number of lines multiplied by the number of characters per line. The screens of a message are displayed in succession until the operator uses the keyboard to select one of the proposals from those offered by the message, with the action on the keyboard causing another message to appear, and so on, until the result desired by the operator is obtained.

BRIEF DESCRIPTION OF THE DRAWINGS

An embodiment of the invention is described by way of example with reference to the accompanying drawings, in which:

FIG. 5 is a flow chart for a message program MNI for verifying the date;

FIG. 6 is a flow chart of a subprogram SPMPO of a beginning-of-menu message MPO;

FIG. 7 is a flow chart of the program for the message MPO;

FIGS. 8A and 8B are flow charts showing how the messages of a first set of messages are chained together; and FIGS. 9A, 9B, and 9C are flow charts showing how the messages of a second set of messages are chained together.

MORE DETAILED DESCRIPTION

Figure 1:
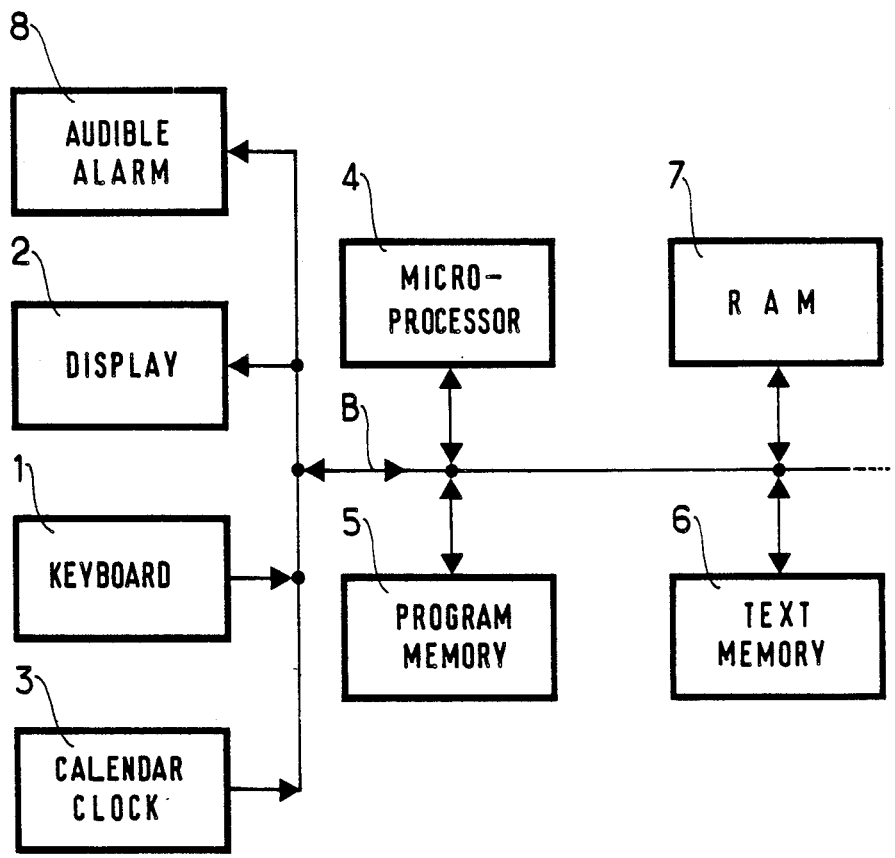
FIG. 1 is a block diagram of a portion of the electronic circuit in a franking machine in accordance with the invention.

FIG. 1 is a block diagram of a portion of the electronic circuit of a franking machine in accordance with the invention, and comprising: a keyboard 1; a display 2; a calendar clock 3; a microprocessor 4 together with program memory 5; and a two-way bus B interconnecting these various items. A franking machine in accordance with the invention also includes a text memory 6 which is a read only memory (ROM) and a working memory 7 (RAM= random access memory), with said text memory and working memory being connected to the bus B. In a franking machine in accordance with the invention, the keyboard has sixteen keys; the display is, for example, of the alphanumeric type; and the alarm indicator lamps are replaced by warning messages appearing on the display, optionally accompanied by an audible alarm 8 connected to bus B.

Figure 2:
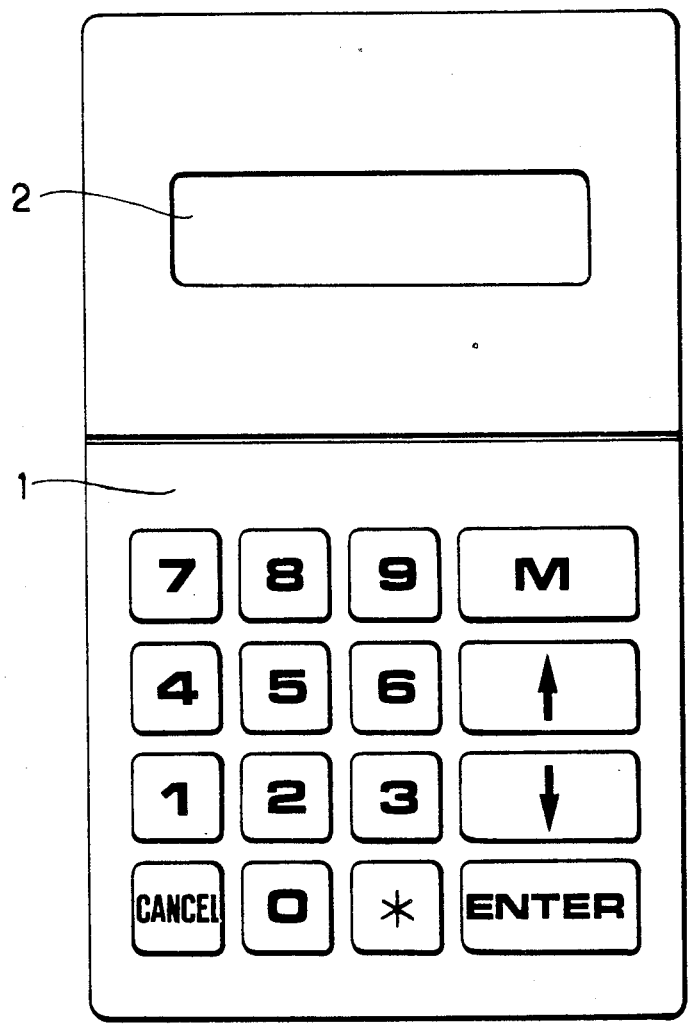
FIG. 2 shows a display and a keyboard of FIG. 1.

FIG. 2 shows a display-and-keyboard assembly with which the machine is equipped. The keyboard 1 has 16 keys and the display 2 is an alphanumeric display.

Currently available alphanumeric displays are suitable for displaying one or more lines each comprising 16, 20, or 40 alphanumeric characters. Such alphanumeric displays are commercialized, for example, by EPSON or by DENSITRON CORPORATION, and are capable of displaying all of the characters that are included in ASCII code (CCITT code No. 5). The franking machine causes messages to appear in the clear on said display, and the operator uses the keys of the keyboard to select one of the proposals in the displayed message. By virtue of the messages, the operator is constantly guided.

In the following description it is assumed, by way of example, that at any given instant the display is capable of displaying two lines of 16 alphanumeric characters each, and is used for transmitting messages to the operator. A message is generally in the form of text. When the message to be displayed requires more than 32 characters it is split up into as many 32-character screens as may be necessary. In other words, a message may comprise one or more screens, with each screen corresponding to a text that makes full use of the capacity of the display, i.e. 32 characters in the example chosen. All of the messages are stored in the text memory 6, FIG. 1.

Each screen appears on the display for a certain length of time, and is then replaced by the following screen such that the sequence of screens reconstitutes the entire message to be displayed. After the time for displaying the last screen of a message has elapsed, the first screen of the same message reappears. The text is thus looped and repeats indefinitely until the operator intervenes. Successive screens thus scroll automatically and the scrolling may be interrupted by using the keyboard. The display time of each screen is a parameter specific to that screen as is the text to be displayed. For example, one screen may appear for two seconds, the next screen may appear for one second, and the third may appear for three seconds. The time for which the text of a screen appears is a function of the qualitative size of the text, and the time is fixed by a program relating to each message.

The keyboard has 16 keys. These comprise:

ten digit keys marked 0, 1, . . . , 9, enabling the operator both to key in a value, e.g. the value of a stamp to be printed, and also to select the proposal to be performed from the numbered proposals provided by the machine's menu;

a "Cancel" key for cancelling the current action, with one or more depressions of this key returning the machine to its initial state, i.e. the state in which a franking value can be keyed in;

an "Enter" key for continuing a selection or a value previously keyed in by the operator using the digit keys;

a star key "*" which, when used simultaneously with the "Enter", key serves to confirm an instruction which changes the operation of the machine;

a Menu key "M" giving access to the first proposals of the menu, which proposals correspond to special operations; and two arrow keys marked with an up arrow and a down arrow for interrupting automatic screen scrolling or for causing the screens to scroll at a rate desired by the operator, with the screens following one another in the natural order for reading text, or else in reverse order.

If one of the arrow keys is depressed, automatic screen scrolling is stopped and the screen currently being displayed remains on display throughout the time that the arrow key remains depressed; when the operator releases the down arrow key the next screen appears, and alternatively when the operator releases the up arrow key the preceding screen appears. In either case the screens return to scrolling automatically five seconds after the key has been released. Simultaneously depressing both arrow keys holds the currently displayed screen on the display, and after both keys are released, screens return to scrolling automatically after five seconds.

At any instant, for a given message being displayed, only the useful keys of the keyboard are active, with useful keys being the keys which correspond to the proposals in the message. For example, if a message has five proposals numbered 1 to 5, then only keys 1 to 5 are active and depressing the other keys has no effect. However, the cancel key is always active.

Regardless of whether they relate to normal franking operations or to special operations accessible via the menu key, messages are controlled by the microprocessor 4 which, for each message, runs a program relating to said message, with the program memory 5 containing all of the programs relating to the messages.

The program memory also contains five specific programs: a keyboard acquisition program; a display program; a date and time acquisition program; a screen timing program; and a program for controlling the audible alarm if the machine is fitted with such an alarm; with each specific program running cyclically and automatically.

The keyboard acquisition program consists in setting up an electronic image of the 16 keys of the keyboard in the working memory 7. In the working memory, each key is represented by a bit whose 1 state corresponds to the key being at rest and whose 0 state corresponds to the key being depressed. The set of 16 keys thus requires 16 bits or two bytes. The keyboard image in the memory therefore occupies a 2-byte memory space; and the contents of this memory space is referred to as the "keyboard image".

In order to perform this function, when under the control of the keyboard acquisition program, the microprocessor examines the state of the first eight keys and stores that state in the working memory and then proceeds in the same way with the last eight keys. However, in order to avoid interference effects due to mechanical bounce which appears whenever the contact of a key is opened or closed, the acquisition program effectively updates the keyboard image only after ensuring that the state of the keys is stable. To do this, the microprocessor sets up a temporary keyboard image in the working memory, and each time it examines the contacts of the keyboard it compares the state of the contacts with the temporary image.

If the state of the contacts is different from the state represented by the temporary image, the microprocessor updates the state of the contacts in the temporary image; however if the state of the contacts is identical with the state of the contacts in the temporary image, and if this identity has lasted for at least 50 milliseconds, the microprocessor then transfers the temporary image into the keyboard image.

Figure 4:
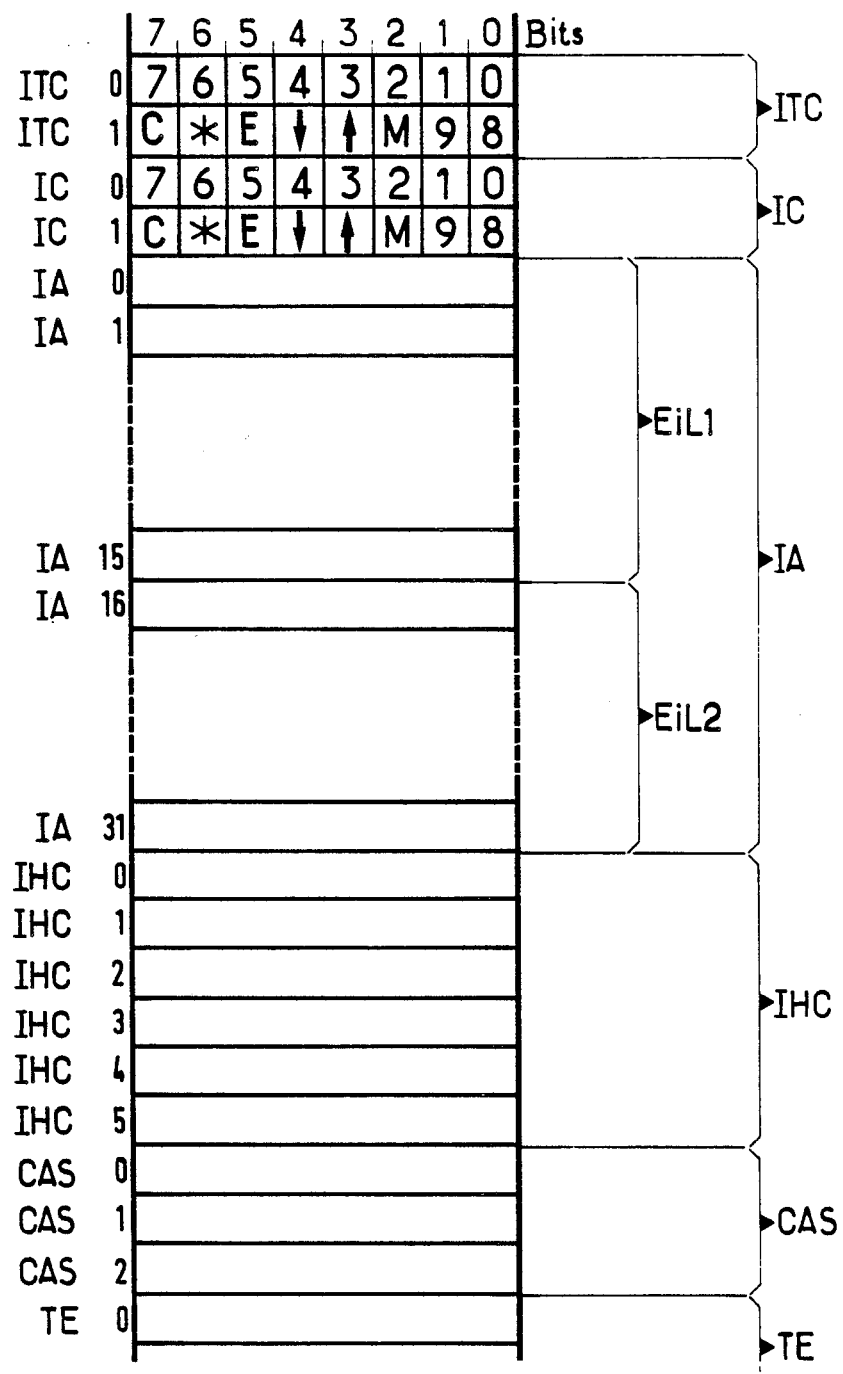
FIG. 4 shows a portion of the contents of a working memory in the FIG. 1 franking machine.

The keyboard acquisition program runs automatically once every 20 milliseconds. The storage of the key state in the working memory is represented in FIG. 4 where the temporary image ITC and the keyboard image IC each occupy 2 bytes of the working memory.

The display program runs cyclically every 100 milliseconds. The display displays the character which it receives at a position given by its cursor (which may be visible or invisible) and then the cursor moves one position to the right. In order to cause a full text of two lines each containing 16 characters (including spaces) to appear on the display, it is necessary:

to position the cursor on the first character of the first line;

to send the first character, then the second character, and so on up to the 16th character;

to position the cursor on the first character of the second line; and to send the 16 successive characters of said second line.

The cursor operating instructions are a part of the display program stored in the program memory of the franking machine, whereas the 2 times 16 characters to be displayed are stored consecutively in the working memory where they occupy a space of 32 bytes. This space is reserved for the screens to be displayed, as explained below, and constitutes an electronic image of the display.

The display program thus consists in taking each byte of the image to be displayed from the working memory and in sending it to the display, together with interspersed cursor positioning instructions. In order to be displayable, the characters contained in the display image must be represented in ASCII code. The space reserved in the working memory for the display image IA is shown in FIG. 4.

The program for acquiring the date and the time runs automatically every 100 milliseconds. The calendar clock of the franking machine has a series of six counters which are incremented respectively once every: second; minute; hour; day; month; and year. The program for acquiring the date and the time thus consists, for the microprocessor, in reading the contents of each of these counters and in writing them to the working memory in a space comprising six consecutive bytes, i.e. one byte per counter. This space provides an image of the calendar clock, and said image is refreshed every 100 milliseconds by the program for acquiring the date and the time. The space IHC reserved in the working memory for the calendar clock image is shown in FIG. 4.

The program for controlling the audible alarm runs automatically every 20 milliseconds. Franking machines generally include alarms which are constituted by indicator lamps; of the various operations which an operator can perform some can be illegal under certain circumstances: for example franking may be impossible if the requested stamp value is greater than a certain value, or if credit has been exhausted.

Generally there is a different indicator lamp for each of these conditions, thus giving rise to a proliferation of indicator lamps. In a franking machine in accordance with the invention, there are no indicator lamps, and they are replaced by warning messages which appear on the display, which messages may optionally be accompanied by an audible alarm in order to attract the attention of the operator. The audible alarm is generated, for example, by a piezoelectric buzzer and it may be modulated as a function of the events that trigger it: the audible alarm may consist in a single audible beep, or in a series of audible beeps at a faster or slower rate.

In order to control the buzzer, there is a 3-byte audible alarm control space CAS in the working memory as shown in FIG. 4:

the first byte contains the number of audible beeps which are to be emitted;

the second byte contains the time during which a beep should be emitted; and the third byte contains the time of the silence between two audible beeps.

The time contained in the second and third bytes is not expressed in seconds, but as a number such that the effective time corresponds to said number multiplied by 20 milliseconds. If the contents of the first byte is zero, no audible beep is emitted; however if its value is FF in hexadecimal code, then sound emission is continuous.

The program for controlling the audible alarm consists in executing the following actions:

Action 1: if the contents of the first byte is zero, the audible alarm program is terminated, else move on to action 2;

Action 2: the buzzer is activated during the time specified by the second byte; at the end of this time move on to action 3;

Action 3: the buzzer is deactivated for the length of time specified by the third byte; at the end of this time move on to action 4;

Action 4: if the contents of the first byte is equal to FF, return to action 1, else decrement the counter of the first byte by 1 and then return to action 1.

The timing program serves to cause each screen of a message to appear for a certain length of time, which length of time may vary from one screen to another. This length of time referred to as screen time is stored in a byte TEO of the working memory shown in FIG. 4. The timing program runs automatically every 20 milliseconds. Timing is specified by initially loading the timing byte with a number, such that the length of time is equal to said number multiplied by 20 milliseconds; thus for a time period of 1 second the number 50 must be loaded into the timing byte, thus giving a screen time of 1 second. The timing program consists in decrementing the timing byte by 1 if the contents of said byte is not zero; screen time has expired when the contents of the timing byte reaches zero.

The five above-mentioned specific programs serve to simplify the programs relating to the messages and to simplify execution thereof.

The texts displayed by the display comprise a fixed portion which is taken from the text memory and a variable portion such as: date, type of operation, stamp value, ceiling value, limit value, credit value, etc. The fixed messages contained in the text memory leave room for variable texts to be subsequently inserted in the display image IA of the working memory.

Figure 3:
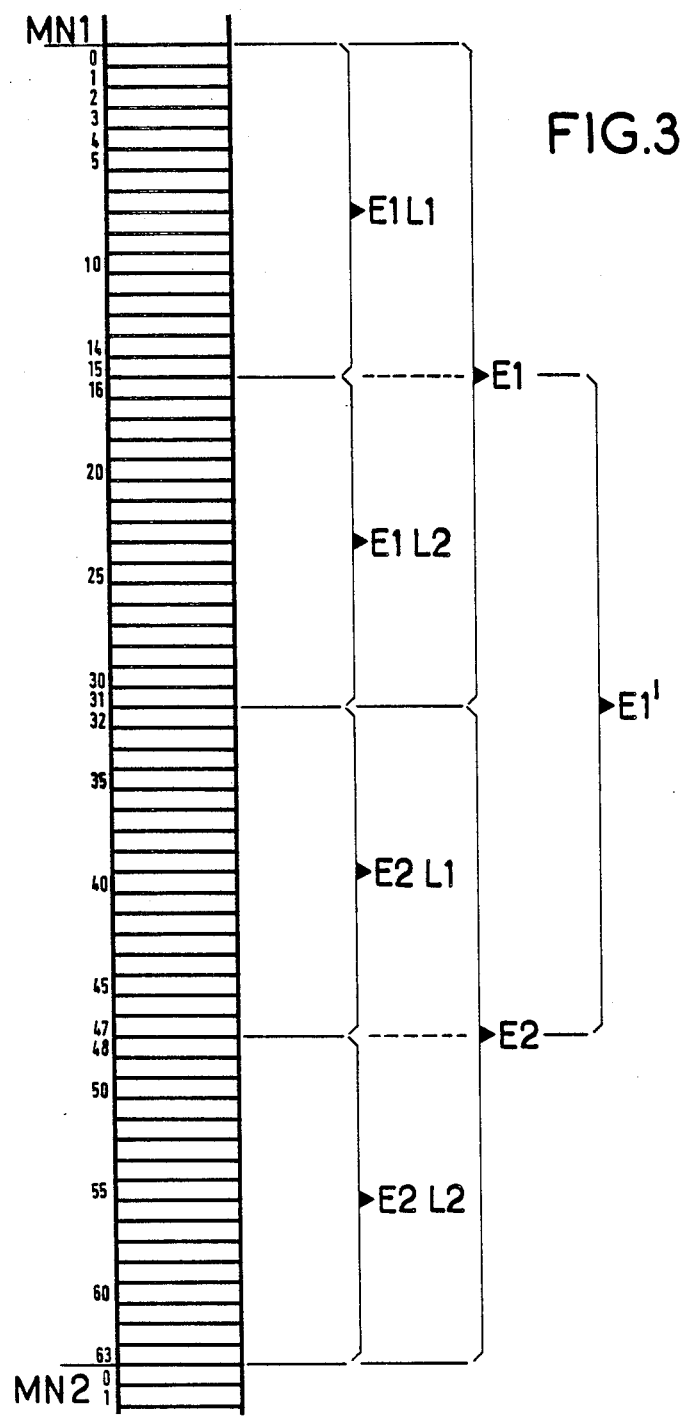
FIG. 3 shows a portion of the contents of a text memory in the FIG. 1 franking machine.

FIG. 3 shows a portion of the contents of the text memory, and in particular a message M1 which is split into two screens E1 and E2 each comprising two 16-character lines, for use with a display capable of displaying two 16-character lines. The message M1 occupies 64 bytes of the text memory which are numbered 0 to 63. For screen E1, the first line E1LI occupies bytes 0 to 15 and the second line EIL2 occupies bytes 16 to 31. For screen E2, the first line E2LI occupies bytes 32 to 47 and the second line E2L2 occupies bytes 48 to 63. Naturally, the text memory also contains other messages, with each message being likewise split into a certain number of screens. Each message must be formatted as a function of the display capacity of the display.

FIG. 4 shows a portion of the contents of the working memory, this portion comprises:

2 bytes ITCO and ITCl for the temporary keyboard image ITC;

2 bytes IC0 and IC1 for the keyboard image IC; (in these four bytes, the numbers, letters, and symbols shown are those on the 16 keys of the keyboard, with M designating the menu, E designating the enter key, and C designating the cancel key, and with each key corresponding to a single bit in these bytes);

32 bytes IA0 to IA31 for the screen image IA, with bytes IA0 to IA15 being reserved for the first line EiL1 of a screen Ei, and with bytes IA16 to IA31 being reserved for the second line EiL2 of screen Ei; each byte relates to one character, and this 32-byte memory space corresponds to a display having two lines of 16 characters each; in a more general manner the memory space constituting the display image is a function of the capacity of the display used; for a display having L lines by N characters, the necessary memory space for the display image requires N.L bytes which are numbered IA0 to IA(NL - 1);

6 bytes IHC0 to IHC5 for the calendar clock image IHC; byte IHC0 is reserved for the year, running from 0 to 99; byte IHC1 is reserved for the month, running from 1 to 12; byte IHC2 is reserved for the day, running from 1 to 31; byte IHC4 is reserved for the hour, running from 0 to 23; byte IHC4 is reserved for the minute, running from 0 to 59; and byte IHC5 is reserved for the second, running from 0 to 59;

3 bytes CAS0 to CAS2 for controlling the audible alarm CAS, with byte CAS0 being reserved for the number of beeps to be emitted, byte CAS1 being reserved for the beep emission time; and byte CAS2 being reserved for the silent time between two beeps; and 1 byte TEO for screen timing TE.

The temporary screen image ITC and the screen image IC are defined above and are refreshed by the keyboard acquisition program, also described above.

The display image IA is a memory space reserved for the text of a screen which is transferred from the text memory into the working memory where it may optionally receive additional variable text prior to being displayed on the display, this memory space is read by the display program.

The calendar clock image IHC is reserved for date and time information taken from the six counters in the calendar clock. This calendar clock image is refreshed every 100 milliseconds by the above-described date and time acquisition program.

The 3-byte memory space for controlling the audible alarm CAS is read by the audible alarm control program as described above.

The screen timing byte TEO is read by the above-described timing program.

The working memory also includes further information which is described below and which needs to be maintained when the machine is unpowered; the memory is therefore backed up by a battery in conventional manner.

These five specific programs which run automatically are used by the programs relating to the various messages in order to display the screens of each message as described below in two examples concerning the sequence of operations for two programs relating to two messages.

The messages available to the operator make it possible either to perform normal franking operations or else to perform special operations which are accessible via the keyboard menu key, as mentioned above.

The following description of messages relates to a prepayment franking machine; if the machine is a postpayment machine the texts of some of the messages need to be modified.

Messages relating to normal franking operations constitute a first set of messages designated below by MN1, MN2, . . .

Figure 8A:
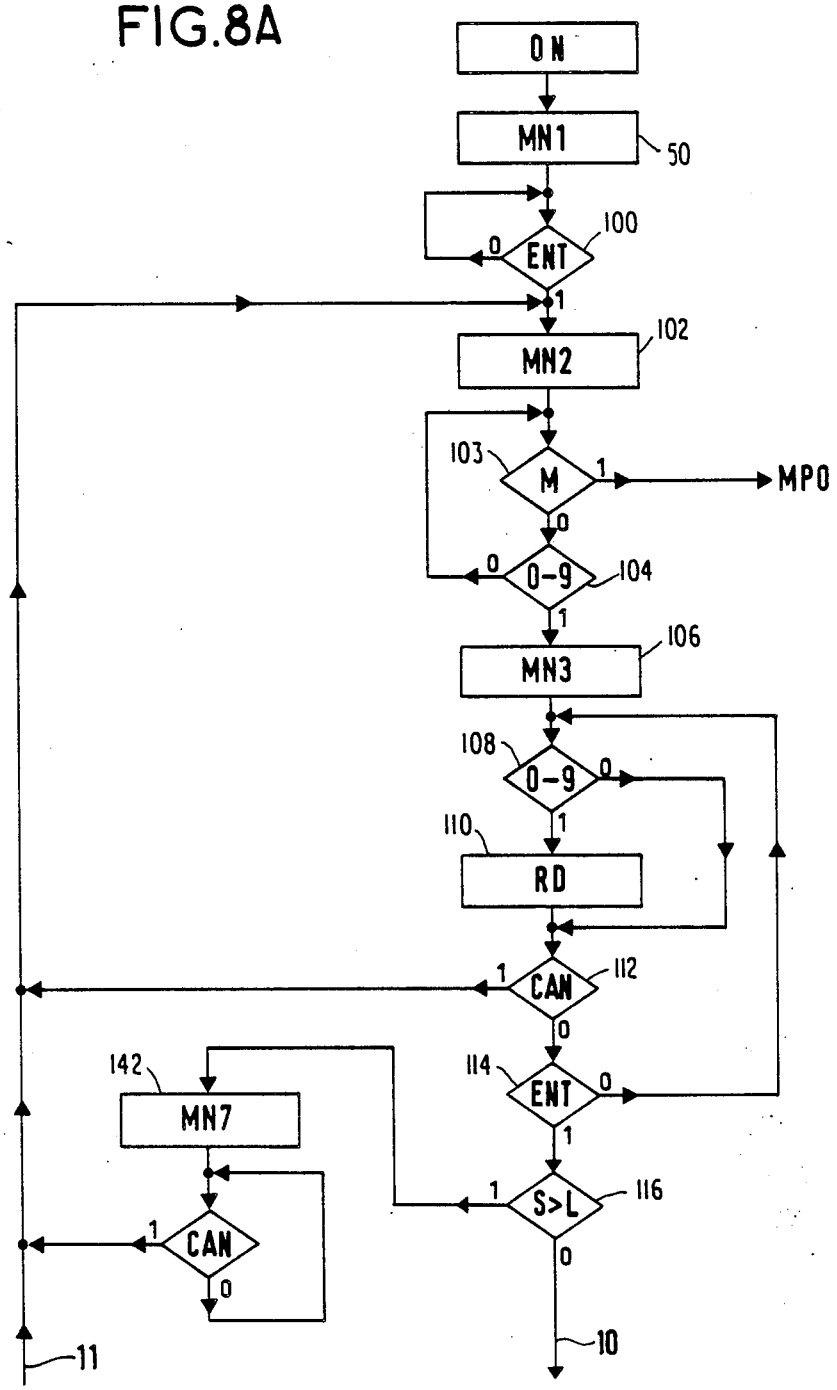
Figure 8B:
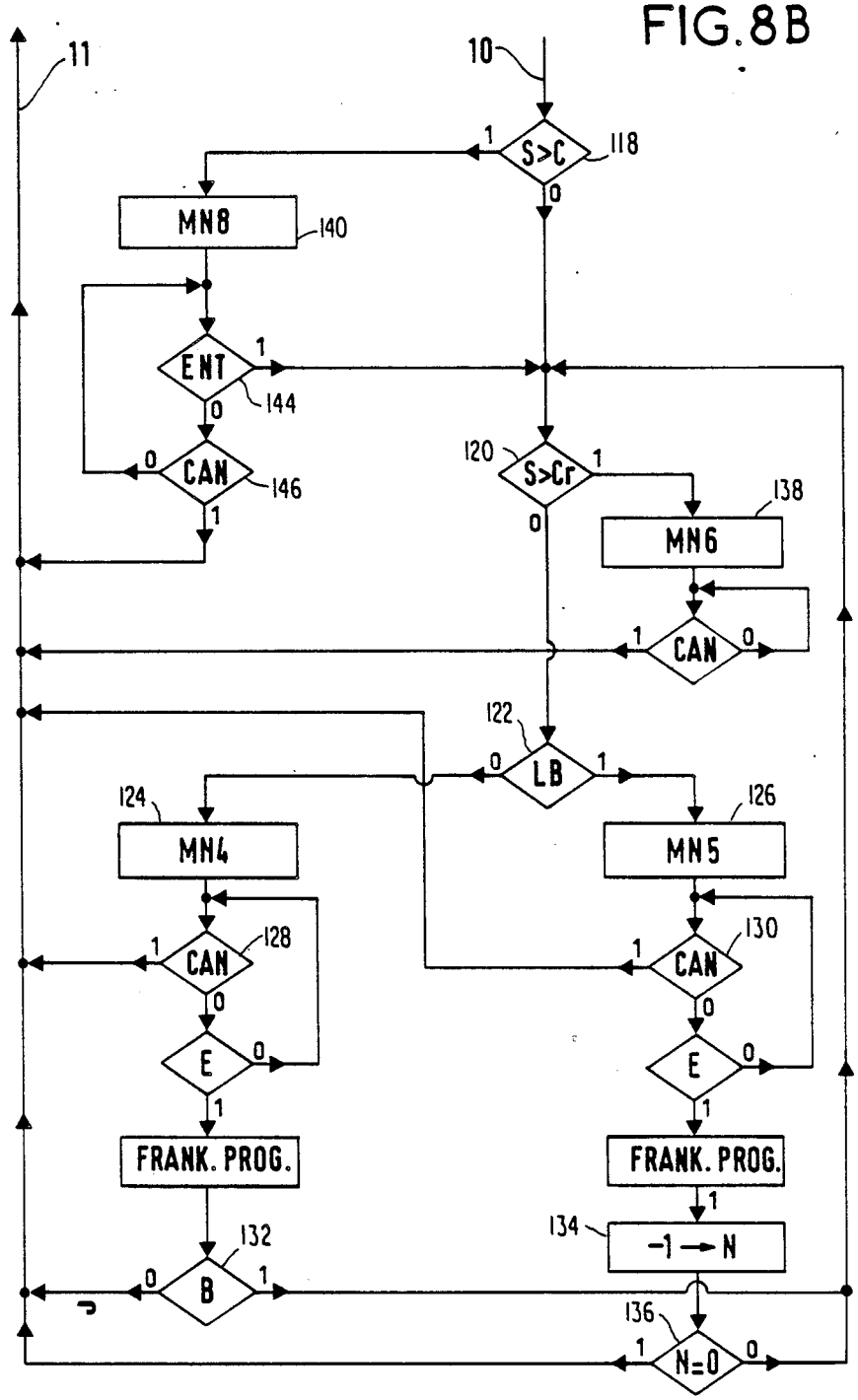

The flow charts of FIGS. 8A and 8B show how these messages are chained together:
  Message MN1: Verify the date;
  Message MN2: Franking or menu;
  Message MN3: Key in franking value;
  Message MN4: Stamp value valid, for one off mode or burst mode;
  Message MN5: Stamp value valid for limited burst mode;
  Message MN6: Out-of-credit;
  Message MN7: Franking limit exceeded; and
  Message MN8: Safety ceiling exceeded.

Messages MN1, MN6, MN7, and MN8 are warning messages which may optionally be accompanied by an audible alarm.

These various messages are described below.

Message MN1 - Verify the date

For machines that automatically supply the date, this message does not exist and the message MN2 appears as soon as the machine is powered up.

If the stamp cancelling date is obtained by the operator manually positioning setting wheels, this message appears only for the first occasion in the day when the franking machine is powered up. This message comprises the following two screens which appear in succession on the display:

| Screen 1 | Verify state of setting wheels | (1 second + 2 beeps) |
|---|---|---|
| Screen 2 | Date = DD/MM/YY press Enter | (2 seconds) |

Screen 1 is displayed for 1 second and screen 2 is displayed for 2 seconds; the alarm comprises 2 beeps.

The day, DD, the month, MM, and the year, YY, are provided by the calendar clock of the franking machine. This message invites the operator to move the "date" setting wheels to the current date. When this action has been performed, the operator presses the Enter key. After this check has been performed, the machine notes that the "change of date" operation has been performed and for the remainder of the day each time the machine is powered up message MN1 does not appear and is replaced by message MN2.

While message MNI is present, only the Enter key is active. After the operator has pressed the Enter key, this is detected at step 100 and message MN2 appears.

Message MN2 - Franking or menu

After message MN1 has been confirmed by pressing the Enter key, or after powering up without a change of date, or following a depression of the Cancel key, message MN2 appears at step 102.

This message is constituted by the following three screens which appear in succession:

| Screen 1 | Stamp = 0000 Credit = XXXXXX | (2 seconds) |
|---|---|---|
| Screen 2 | Key in stamp value | (1 second) |
| Screen 3 | Or press M for MENU | (1 second) |

Screens 1, 2, and 3 are displayed for 2, 1, and 1 seconds respectively.

When message MN2 is present, only the digit keys the Enter key, and the Menu key are active.

The digit keys enable the operator to key in the value of the stamp, the operation of the Menu key is detected at step 103 and gives access to special operations by causing a message listing various operations to appear in a manner explained below. As soon as a digit key has been pressed, the Menu key becomes inactive.

Message MN2 represents the initial state for normal franking operations, since the first message MN1 appear only on the first occasion that the machine is powered up in the day. In screen 1 of message MN2, the value of the stamp is set to zero for reasons of security, and the remaining credit is displayed in the clear.

The operator should not key in a stamp of value greater than the remaining credit. As soon as the operator depresses a digit key in order to key in the value of the stamp, this in detected at step 104 and message MN3 appears at step 106.

Message MN3 - Key in franking value

This message in constituted by the following two screens:

| | | |
|---|---|---|
| Screen 1 | Stamp = OOOX<br>Key in value | (3 seconds) |
| Screen 2 | Then press Enter<br>or Cancel | (1 second) |

Screens 1 and 2 are displayed for 3 and 1 seconds, respectively.

The first zero at the right of the stamp value is replaced by the first digit keyed in on the keyboard; a second digit key press shifts the preceding digit on Screen 1 one position to the left and the second keyed-in digit occupies the righthand position. Third and fourth digits may be keyed in by the operator; they appear at the right of screen 1 after the value of the stamp has shifted to the left. Each digit key-press is detected at step 108 and automatically brings Screen 1 back to the display at step 110, such that if the time between two key presses is less than 3 seconds only Screen 1 appears; Screen 2 will appear only after 3 seconds have elapsed from the last digit being pressed.

During message MN3, only the digit keys, the Enter key and the Cancel key are active. If a mistake is made while keying in the value of the stamp, the operator can change the keyed-in value by pressing the Cancel key which is detected at step 112 and returns to message MN2, thereby enabling a new stamp value to be keyed in. If the keyed in stamp value is correct, the operator presses the Enter key, even if Screen 2 is not on display.

Once the operator has keyed in a stamp value and pressed Enter, prior art franking machines generally have only one operating mode suitable for franking an unlimited number of pieces until the credit is exhausted. The present invention makes three operating modes available, with the operating mode in use being selected by the operator. These operating modes are as follows:

one-off mode: after each franking operation the stamp value is reset to zero; in this case a new stamp value must be keyed in for the following franking operation. This mode of operation provides additional security by preventing successive franking operations being performed without each value being individually verified;

burst mode: after each franking operation the stamp value is not reset to zero as it is in the preceding mode. It is therefore possible to perform an unlimited sequence of same-value franking operations within the credit limit; and limited burst mode: this is identical to the preceding operating mode, but the number of franking operations is limited to a number N previously set by the operator. Once the number N of franking operations has been performed, the machine reverts automatically to "one-off" mode. If the credit is exhausted before the N franking operations have been performed, franking is no longer possible.

The operator selects the operating mode in a manner described below. If "one-off" or "burst" mode has been selected by the operator, the machine remains in the selected mode even after being switched off and restarted. In contrast, in "limited burst" mode, switching the machine off automatically puts it into "one-off" mode when it is next switched on.

If the franking machine is not equipped for changing its operating mode, then it operates in burst mode.

When the operator confirms the stamp value by pressing Enter and this is detected at step 114, and if step 116 determines that the confirmed value does not exceed a previously fixed limit value, then message MN4 appears at step 124 in one-off mode or in burst mode; however if step 122 determines that the machine is in limited burst mode, then message MN5 appears at step 126.

Message MN4 - Stamp value valid, for one-shot mode or burst mode

This message comprises the following two screens which appear in succession:

| | | |
|---|---|---|
| Screen 1 | Stamp = XXXX<br>Credit = XXXXXX | (3 seconds) |
| Screen 2 | Frank or<br>Cancel | (1 second) |

Screens 1 and 2 are displayed for 3 and 1 seconds respectively. The stamp value and the credit value appear in the clear.

Message MN5 - Stamp value valid for limited burst mode

This message is constituted by the following two screens which appear in succession:

| | | |
|---|---|---|
| Screen 1 | Stamp = XXXX<br>burst size = NNN | (3 seconds) |
| Screen 2 | Frank or<br>Cancel | (1 second) |

Screens 1 and 2 are displayed for 3 and 1 seconds respectively. The value of the stamp and the number of pieces remaining in a limited burst are shown in the clear.

During both of these two messages MN4 and MN5, only the Cancel key is active and this is monitored at steps 128 and 130.

In one-off mode detected at step 132, message MN4 is replaced by message MN2 after an envelope has passed through the machine.

In burst mode detected at step 132, the credit in Screen 1 of message MN4 is decremented by the value of the stamp each time a franking operation is performed, and Screen 1 remains on display if the franking rate is faster than 1 every 3 seconds, with Screen 2 then being displayed only after 3 seconds have elapsed since the last envelope was passed.

In limited burst mode, the number NNN in Screen 1 of message MN5 corresponds to the number N of envelopes still to be franked, and it appears in the clear while being decremented by 1 at step 134 after each franking operation. If the franking rate is faster than one piece every 3 seconds, screen 1 remains on display. After the last envelope has passed and the number NNN has been reduced to zero as detected at step 136, message MN2 is displayed.

Should the credit be exhausted while franking in burst mode or in limited burst mode, this is detected at step 120 and the machine stops and message MN6 appears on the display at step 138.

Message MN6 - Out-of-credit

This message exists only for prepayment franking machines. The message is constituted by the following two screens which appear in succession:

| Screen 1 | Stamp XXXX Out-of-credit | (3 seconds + beeps) |
|---|---|---|
| Screen 2 | Cancel your request | (1 second) |

If the stamp value keyed in during message MN3 exceeds the amount of credit remaining, and if the operator then presses Enter, message MN6 appears at step 138.

If the franking value is limited to a so-called "limit" value by mechanical or electrical means when the franking machine is put into operation, then franking to a value greater than the limit value is impossible upon detection of this at step 116 and the machine locks up, and in addition said limit value cannot be changed by the operator. The present invention also makes it possible to allow the operator to set the limit value and a ceiling value, and to change them if so desired, and to perform a franking operation to a value which is greater than the ceiling value.

In order to do this, when the operator presses Enter to confirm a franking value which is greater than the ceiling value during message MN3, the Enter key does not give rise to a franking operation, but instead message MN8 appearsat step 140. Franking can only be performed by confirming message MN8 as described below with respect to this message. If a value greater than the limit value is confirmed by pressing Enter during message MN3, then this is detected at step 116 and message MN7 appears at step 142

Message MN7 - Franking limit exceeded

It is not possible to print a stamp whose value exceeds the franking limit, and the machine alerts the operator by a sequence of audible beeps and by displaying message MN7. In this state, the machine prevents the franking procedure from being engaged if the operator presents an envelope or it prevents the presentation of an envelope and the engagement of the franking procedure if the machine is an automatic machine.

In order to obtain a stamp whose value exceeds the franking limit, the operator must change the limit by means of a message which is available from the menu key and is described below. If the limit value is zero then the machine is disabled. However, if the limit is equal to the maximum capacity of the machine, for example 9999 for a four-digit machine, then there is no franking limit.

Message MN7 is constituted by the following three screens which appear in succession:

| Screen 1 | Stamp = XXXX You are over the | (3 seconds + 4 beeps) |
|---|---|---|
| Screen 2 | Franking limit = XXXXX | (2 seconds) |
| Screen 3 | Press Cancel | (1 second) |

Screens 1, 2, and 3 are displayed for 3, 2, and 1 seconds respectively, four alarm beeps are emitted while displaying Screen 1. The stamp value and the limit value appear in the clear. Cancelling returns to message MN2.

Message MN8 - Safety ceiling exceeded

If a franking value which is greater than said security ceiling is confirmed during message MN3 by pressing Enter, then this is detected at step 118 and message MN8 appears at step 140 and the operator can then either cancel or confirm the franking value at steps 146 and 144, respectively.

The operator is in control of the security ceiling, and the way in which the security ceiling can be set and changed is explained below when describing the messages which are accessible via the menu key.

The use of a ceiling provides additional security and serves to alert the operator whenever the keyed-in stamp value is excessive compared to the normal usage for the machine.

Message MN8 is constituted by the following three screens which appear in succession:

| Screen 1 | Stamp = XXXX You are over the | (2 seconds + beeps) |
|---|---|---|
| Screen 2 | Security ceiling = XXXX | (2 seconds) |
| Screen 3 | Press Enter or Cancel | (1 second) |

Screens 1, 2, and 3 are displayed for 2, 2, and 1 seconds respectively, and in addition alarm beeps are emitted while displaying screen 1. The stamp value and the ceiling value appear in the clear.

Pressing Cancel at step 146 causes message MN2 to appear, but if the operator confirms the value of the stamp by pressing the Enter key, then the stamp at stem 144 value is accepted even though it exceeds the ceiling. In this case, message MN4 or MN5 appears depending on the operating mode of the franking machine.

If the security ceiling as loaded by the operator is equal to the maximum capacity of the machine, for example 9999 for a four digit machine, then there is no security ceiling. In contrast, if the operator loads the value 0000, then every stamp value that is keyed in requires confirming twice over, once for message MN3 and again for message MN8.

The franking limit is generally greater than the security ceiling since franking is impossible above the franking limit, however the operator has freedom of choice, including the choice of values for the security ceiling and the franking limit.

The messages relating to the special operations accessible via the menu key constitute a second set of messages and are designated below by MP0, MP1, . . .

Message MP0: Beginning-of-Menu
Message MP1: Machine state
Message MP2: Auxiliary meters
Message MP3: Select an auxiliary meter
Message MP4: Confirm the selected state (for a meter)
Message MP5: Select a mode of machine operation (one-off, burst, limited burst)
Message MP6: Confirm the selected mode of operation
Message MP7: Select the number of pieces for limited burst mode
Message MP8: Change the security ceiling
Message MP9: Change the franking limit If the machine has only one operating mode, message MP5 for selecting operating mode does not exist; if a fixed limit value is imposed when the machine is put into operation, then the message MP9 for changing the franking limit does not exist, but the machine may nevertheless be optionally provided with a security ceiling which is lower than the limit value, and message MP8 for changing the security ceiling exists or not as the case may be.

Figure 9A:
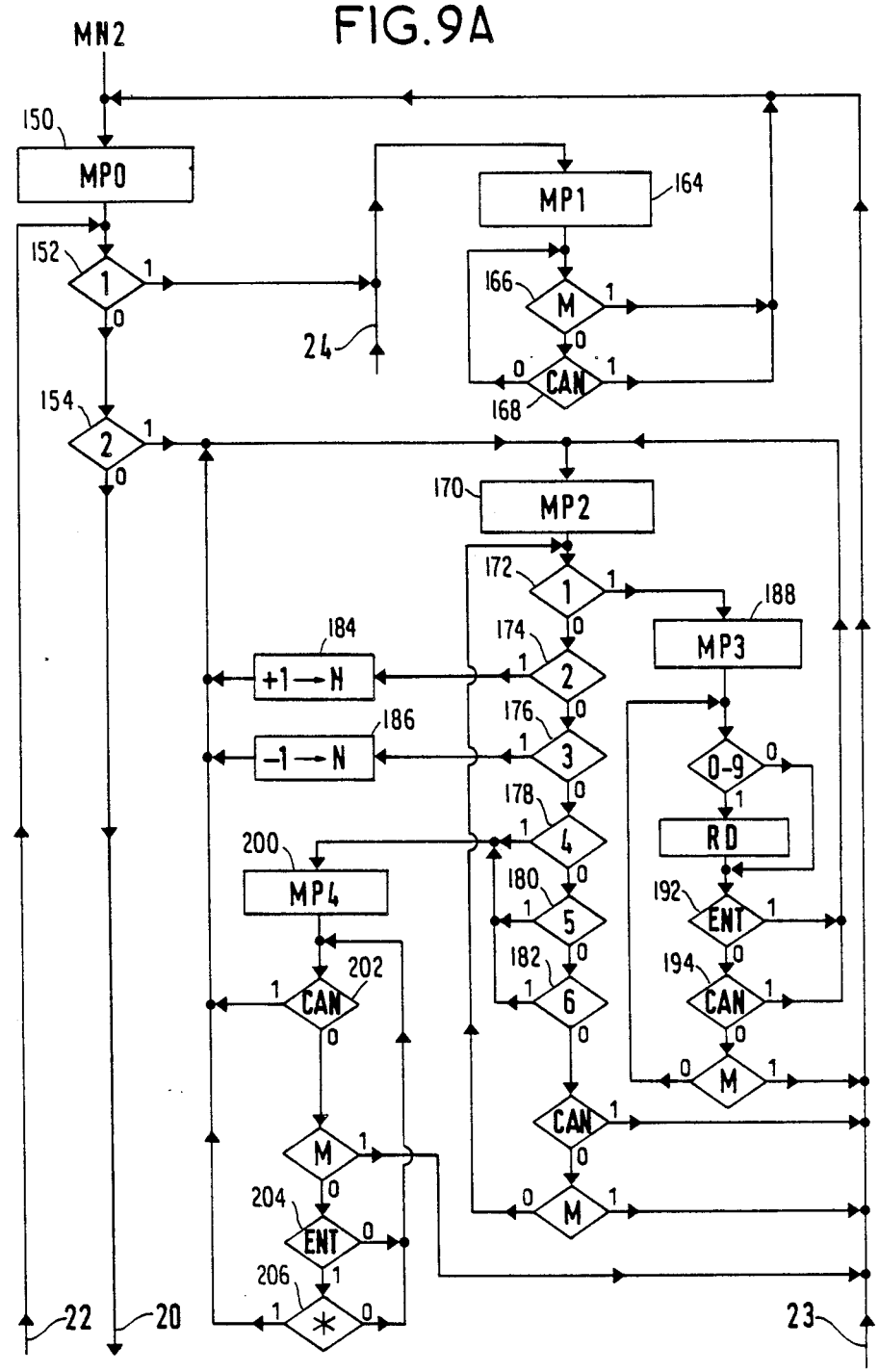
Figure 9B:
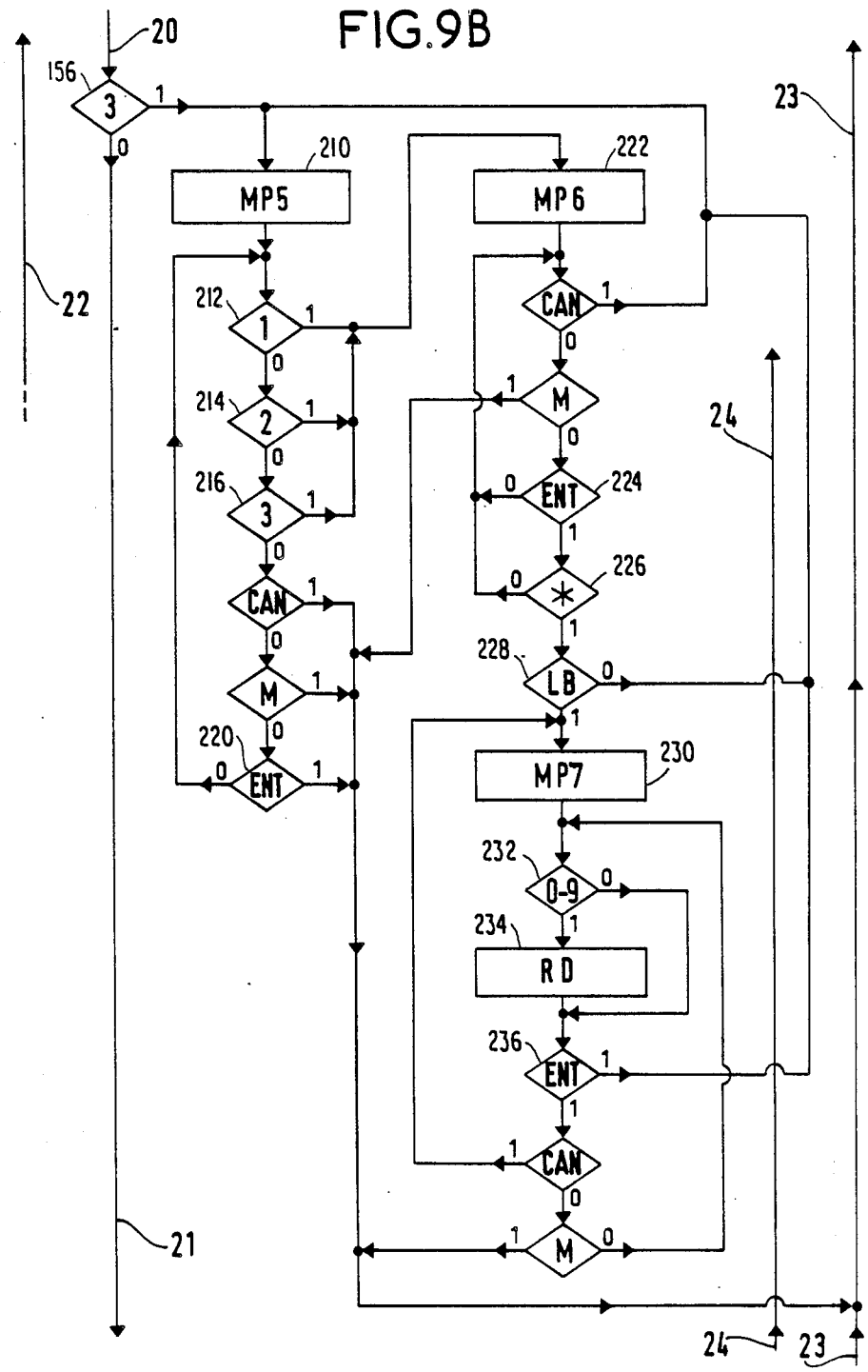
Figure 9C:
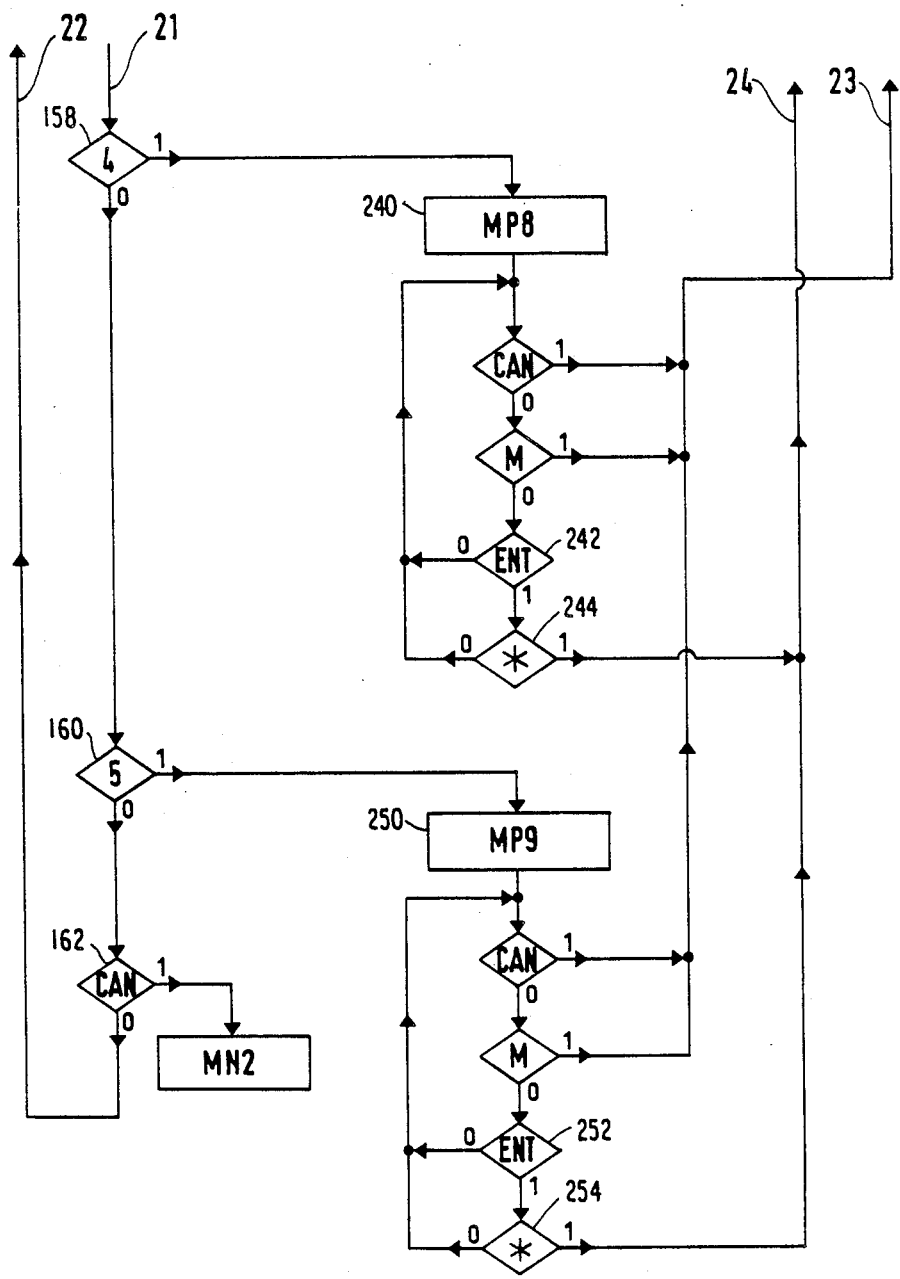

The various messages MP0 to MP8 are described below with FIGS. 9A, 9B, and 9C showing how these messages are chained together.

Message MP0 - Beginning-of-menu

This message displayed at step 150 following operation of the menu key at step 103 and is constituted by the following seven screens:

| | | |
|---|---|---|
| Screen 1 | Which option do you want? | (1 second) |
| Screen 2 | 1 - Machine state | (2 seconds) |
| Screen 3 | 2 - Auxiliary meters | (2 seconds) |
| Screen 4 | 3 - Change mode | (2 seconds) |
| Screen 5 | 4 - Change ceiling | (2 seconds) |
| Screen 6 | 5 - Change limit | (2 seconds) |
| Screen 7 | Select | (1 second) |

Screens 4, 5, and 6 exist only if the machine is equipped with the corresponding options.

Screens 1 and 7 are displayed for 1 second each while Screens 2, 3, 4, 5, and 6 are displayed for 2 seconds each.

If the operator presses the Cancel key, this is detected at step 162 and the system returns to message MN2.

The digit at the beginning of each of Screens 2 to 6 corresponds to one of the digit keys on the keyboard and enables the operator to select between the proposed options with the selected option being detected at steps 152-160.

Message MP1 - Machine state

This message is displayed at step 164 and comprises the following seven screens:

| | | |
|---|---|---|
| Screen 1 | Remaining credit = XXXXXX | (2 seconds) |
| Screen 2 | Index counter = XXXXXXXXXX | (2 seconds) |
| Screen 3 | Cycle counter = XXXXXXXX | (2 seconds) |
| Screen 4 | Date = DD/MM/YY Time = HH.MM | (2 seconds) |
| Screen 5 | Mode = XXXXXXXX | (2 seconds) |
| Screen 6 | Franking limit = XXXX | (2 seconds) |
| Screen 7 | Security ceiling = XXXX | (2 seconds) |

Each screen is displayed for 2 seconds.

This message informs the operator on the state of the machine.

In Screens 1, 2, and 3, the credit value, the index counter value, and the cycle counter value are displayed in the clear. In screen 4, the date and the time are displayed in the clear, and if screen 4 is permanently displayed by pressing on one or both of the arrow keys, then the dot between the hour HH and the minute MM flashes once a second.

The second line of screen 5 is constituted by one of the three following texts: one-off, burst, burst of XXX with the number of pieces (franking operations) being shown in the clear.

The value of the security ceiling, Screen 7, is likewise indicated in the clear, as is the franking limit, Screen 6.

This message MP1 does not provide any selections. Pressing the Cancel key at step 168 or the Menu key at step 166 returns to start of menu message MP0.

Message MP2 - Auxiliary meters

Message MP3 - Select an auxiliary meter

Message MP4 - Confirm the selected state (for a meter)

The franking machine has a certain number of auxiliary meters, for example 20 meters numbered 1 to 20, with each auxiliary meter being attributed to an account. Each auxiliary meter includes a money meter which totalizes the value of the franking performed and a piece count meter which counts the number of pieces (i.e. the number of franking operations performed on envelopes or labels).

The operator has the choice of resetting to zero, stopping, or starting both the money meter and the piece count meter of any auxiliary meter independently from the other auxiliary meters. Message MP2 is used in conjunction with messages MP3 and MP4 as explained below in the description of messages MP2, MP3, and MP4.

Message MP2 concerning auxiliary meters displayed at step 170 and comprises the following seven screens:

| | | |
|---|---|---|
| Screen 1 | Meter No. XX is XXXXXXXX | (2 seconds) |
| Screen 2 | $ XXXXXX.XX XXXXXX pieces | (3 seconds) |
| Screen 3 | Last cleared on DD/MM/YY, HH.MM | (1 second) |
| Screen 4 | Select 1 - Meter No. XX | (2 seconds) |
| Screen 5 | 2 - Next 3 - Preceding | (2 seconds) |
| Screen 6 | 4 - Clear meter 5 - Stop | (2 seconds) |
| Screen 7 | 6 - Start Which number? | (2 seconds) |

Screens 1 to 7 are displayed for 2, 3, 1, 2, 2, 2, 2 seconds respectively.

In Screen 1, the meter number (from 1 to 20) appears and the text on the second line reads "stopped" or "in operation". In Screen 2, the amount of money and the number of pieces are shown, while Screen 3 shows the time and date at which the meter was last reset to zero.

When message MP2 appears due to key 2 being depressed at step 154 while message MP0 is running, the auxiliary meter displayed is the first auxiliary meter (number 1).

The digits 1 to 6 appearing in Screens 4 to 7 of message MP2 enable the operator to select between the various proposed options using the corresponding digit keys in the keyboard with the selected option being detected at steps 172-182.

If the operator presses key 2, the meter number is incremented at step 184 and Screen 1 of message MP2 appears with the number of the next meter or with meter number 1 if the previous meter was meter number 20.

If the operator presses key 3, the meter number is decremented at step 186 so that the preceding meter is selected, or meter number 20 if meter number 1 was the meter being displayed prior to key 3 being depressed.

In order to select an arbitrary meter, the operator may use key 1 which causes selection message MP3 to appear at step 188.

In order to change the state of a previously selected auxiliary meter, the operator uses keys 4, 5, and 6. Pressing any one of these keys causes message MP4 to appear, and confirming that message by pressing Enter returns to message MP2 with the selected state being mentioned in the second line of Screen 1 supposing the selected state is stop or start, and with the time and date of the last time the meter was cleared appearing in Screen 3. If the operator selects clearing, then the time and date are the time and date at which said clearing operation was requested. The operator can then select another meter using one of the keys 1, 2, or 3 as mentioned in Screens 4 and 5, or else can return to beginning-of-menu message MP0 by pressing Cancel.

Message MP3 for selecting an auxiliary meter comprises the following two screens:

| Screen 1 | Key in meter number = XX | (2 sec., XX flashing) |
| --- | --- | --- |
| Screen 2 | Then press Enter | (1 second) |

The blank number XX flashes until the operator keys in a number from 1 to 20. Screens 1 and 2 are displayed for 2 and 1 seconds respectively. Pressing Cancel at step 194 returns to message MP2. When the operator has entered an auxiliary counter number, pressing Enter at step 192 returns to message MP2 with the instruction executed, i.e. screen 1 of message MP2 now has the meter number that has just been entered.

Message MP4 for confirming the selected state is displayed at step 200 and comprises the following three screens:

| Screen 1 | Your selection is XXXXXXXX | (2 seconds) |
| --- | --- | --- |
| Screen 2 | Meter number XX Confirm by | (2 seconds) |
| Screen 3 | Pressing both Enter and * | (1 second) |

Screens 1, 2, and g are displayed for 2, 2, and 1 seconds respectively. The text in the second line of Screen 1 is one of the following depending on whether the operator presses key 4, or 5, or 6 while message MP2 was being displayed:
CLEAR: (key 4)
STOP: (key 5)
START: (key 6)
And in Screen 2, the number of the meter is indicated.

Confirmation is obtained by pressing simultaneously on the Enter key and on the Star key, which is detected at steps 204 and 206 and returns to message MP2 with the instruction executed. Pressing Cancel at step 202 returns to message MP2 without the instruction being executed.

Message MP5 - Select a mode of machine operation (one-shot burst, limited burst)

Message MP6 - Confirm the selected mode of operation

Message MP7 - Select the number of pieces for limited burst mode

The franking machine can operate in three different modes: one-off, burst, and burst limited to XX franking operations, and these modes can be selected by means of messages MP5, MP6, and MP7.

Message MP5 is displayed at step 210 (FIG. 9B) when step 156 detects that the operator presses key 3 on the keyboard while message MP0 is being displayed. This message comprises the following five screens:

| Screen 1 | The current machine mode is | (1 second) |
| --- | --- | --- |
| Screen 2 | XXXXXXXX Confirm or | (2 seconds) |
| Screen 3 | Change to 1. one-off | (2 seconds) |
| Screen 4 | 2. burst 3. limited burst | (2 seconds) |
| Screen 5 | Select | (1 second) |

Screens 1 and 5 are displayed for 1 second while Screens 2, 3, and 5 are displayed for 2 seconds each.

Message MP6 is displayed at step 212 and comprises the following screens:

| Screen 1 | Your selection is XXXXXXXX | (1 second) |
| --- | --- | --- |
| Screen 2 | mode. Confirm | (2 seconds) |
| Screen 3 | by pressing both Enter and * | (1 second) |

Screens 1, 2, and 3 are displayed for 1, 2, and 1 seconds respectively.

Message MP7 is displayed at step 230 and comprises the following screens:

| Screen 1 | Key in the number of | (1 second) |
| --- | --- | --- |
| Screen 2 | Pieces = XXX then press Enter | (2 seconds) |

Screens 1 and 2 are displayed for 1 second and 2 seconds, respectively.

While message MP5 is being displayed, the first line of Screen 2 reads either: "one-off", "burst", or "burst of XXX", with the number of pieces XXX being shown in the clear, thereby indicating the current operating mode of the machine. If the operator does not want to change mode, then pressing the Enter key at step 220 returns to message MP0. If the mode is to be changed, the new mode is selected at steps 212-216 using one of the keys 1, 2, or 3 of the keyboard, as indicated in Screens 3 and 4 of message MP5. Once the selection has been made, message MP6 step 222 appears and its screen 1 specifies a mode in line 2: "one-off", "burst", "limited burst". The mode is confirmed by pressing the Enter key and the Star key simultaneously as detected at steps 224 and 226, thereby returning to message MP5 if one-off mode or burst mode have been selected, with the first line of Screen 2 in message MP5 indicating the confirmed mode of operation. In contrasting, if limited burst mode has been confirmed by the operator and is detected at step 228, then message MP7 appears at step 230. The operator must then indicate the number of pieces at steps 232 and 234, and confirm this number by pressing Enter at step 236, thereby returning to message MP5 with the burst size XXX being indicated in the first line of Screen 2, and with the number of pieces XXX being the number entered by the operator.

Regardless of which mode is selected, confirmation returns to message MP5, thereby enabling the operator to check that the machine is indeed operating in the desired mode. Confirming message MP5 at step 220 then returns to message MPO.

Message MP8 - Change the security ceiling

If key 4 on the keyboard is pressed while message MPO is being displayed, then this is detected at step 158 and message MP8 appears at step 240 (FIG. 9C) in order to enable the operator to change the security ceiling. It should be noted that the operator can find out the value of the ceiling in the machine by means of message MP1 which gives the various states of the machine.

Message MP8 is constituted by the following three screens:

| | | |
|---|---|---|
| Screen 1 | Key in the new security | (1 second) |
| Screen 2 | ceiling = XXX Confirm | (2 seconds) |
| Screen 3 | by pressing both Enter and * | (1 second) |

Screens 1, 2, and 3 are displayed for 1, 2, and 1 seconds respectively.

When this message is present, the operator enters the new ceiling which is displayed in the clear in Screen 2. After being confirmed by pressing simultaneously on both the Enter key and the Star key, as detected at steps 242 and 244 message MP1 appears and indicates the new ceiling in Screen 7.

Message MP9 - Change the franking limit

This message appears at step 250 whenever the operator presses key 5 while the message MPO is being displayed, and it comprises the following three screens:

| | | |
|---|---|---|
| Screen 1 | Key in the new franking | (1 second) |
| Screen 2 | Limit = XXXX Confirm | (2 seconds) |
| Screen 3 | by pressing both Enter and * | (1 second) |

As it is keyed in, the new franking limit appears in Screen 2. Confirmation is obtained by simultaneously depressing both the Enter key and the Star key as detected at steps 252 and 254, thereby returning to message MP1.

FIG. 4 shows a portion of the contents of the working memory, which portion is used by the specific programs. The working memory also contains the various machine states, the auxiliary meters, the security ceiling, the franking limit, and the remaining credit in reserved spaces.

The operation of the machine is now described by means of two examples. The first example is message MNI for verifying the date, and the second example is the beginning-of-menu message MPO. These messages, like all of the messages, use the five above-described specific programs which run automatically once the machine is in operation.

Message MN1 - Verify the date

Figure 5:
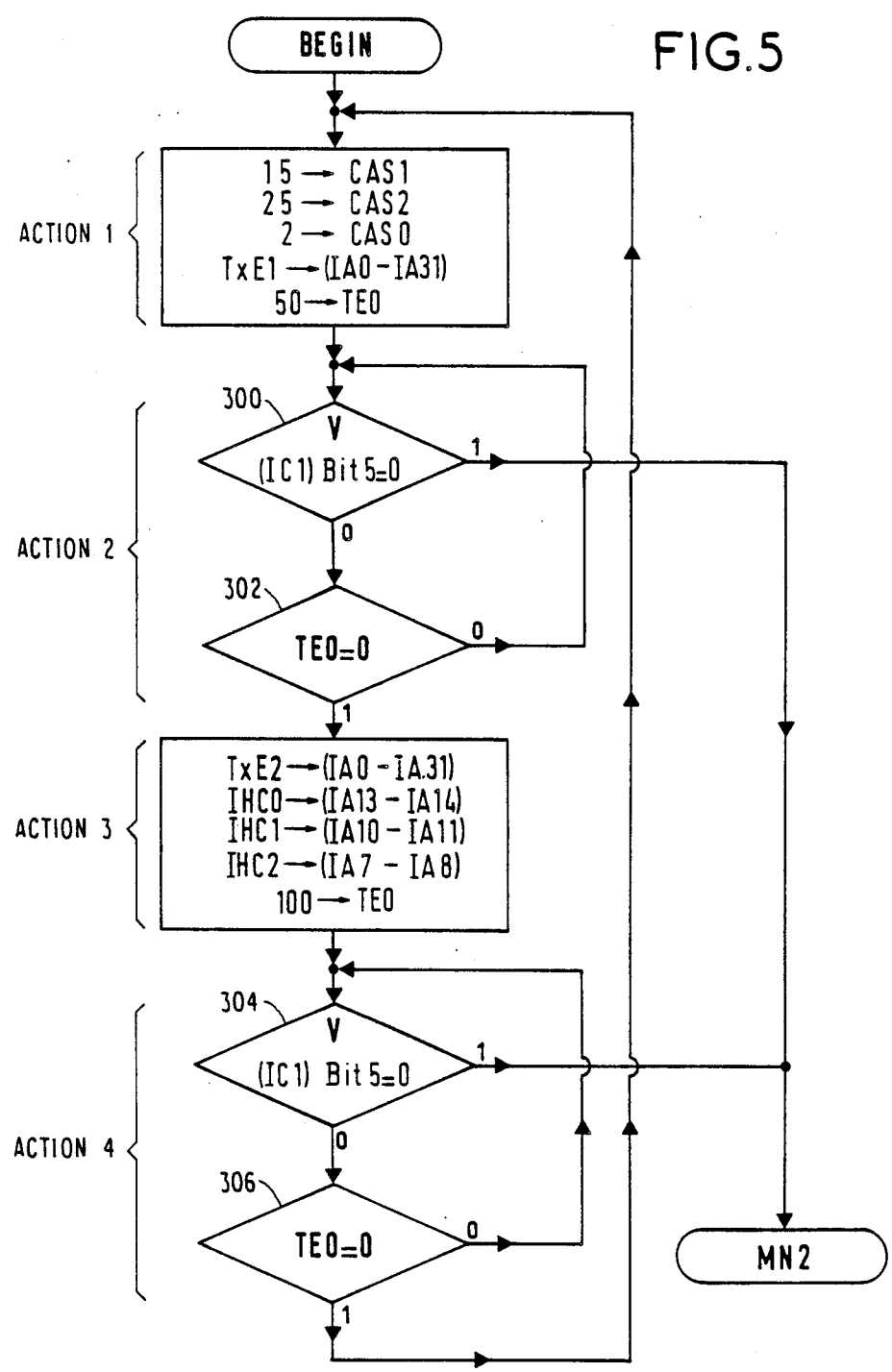
FIGS. 5, 6, 7, 8A, 8B, 9A, 9B, and 9C are flow charts relating to messages; where.

FIG. 5 is a flow chart for this message.

This message appears at step 50 (FIG. 8A) when the machine is powered up for the first time in a given day, and the two screens constituting this message are recalled below:

| | | |
|---|---|---|
| Screen 1 | Verify state of setting wheels | (1 second + 2 beeps) |
| Screen 2 | Date = DD/MM/YY press Enter | (2 seconds) |

The fixed texts "Verify state of setting wheels" and "Date=DD/MM/YY press Enter" are contained in the text memory; each screen text occupies 32 bytes, so message MNI occupies 64 bytes in the text memory as indicated in FIG. 3.

In the program memory, each message corresponds to a particular program. There is thus a date verification program which enables the following actions to be executed in succession:

Action 1 - Program initialization

Load the duration of an audible beep, for example the number 15, into the audible alarm byte CAS1 of the working memory, said number corresponding to an audible beep lasting 0.3 seconds.

Load the inter-beep silence duration, for example the number 25 for a duration of 0.5. seconds into byte CAS2.

Load the number of audible beeps, which is 2 in the case of screen 1, into byte CAS0.

Transfer the text of screen 1 "Verify state of setting wheels" from the text memory into bytes IA0 to IA31 of the working memory, with each letter or space occupying one byte.

Load the number 50 into timing byte TEO, said number corresponding to Screen 1 being displayed for a period of 1 second.

Action 2

If the Enter key is depressed as detected at step 300, bit 5 of keyboard image byte IC1 in the working memory (FIG. 4) has the value zero, so move on to message MN2; the date verification program has terminated.

If the 1 second time-out has elapsed, the contents of the byte TEO is zero as detected at step 302, so move on to action 3, else loop to action 2.

Action 3

Transfer the text of screen 2 "Date=DD/MM/YY press Enter" from the text memory into bytes IA0 to IA31 of the working memory.

Take the contents of year byte IHC0 from the calendar clock image in the working memory, convert it into decimal, convert it into ASCII code, and store the result in byte IA13 (more significant year digit) and in byte IA14 (less significant year digit).

Take the contents of month byte IHC1 and process in the same way as for byte IHC0, and store the result in byte IH10 (more significant month digit) and byte IH11 (less significant month digit).

Take the contents of day byte IHC2, process it as above, and store the result in byte IA7 (more significant day digit) and byte IA8 (less significant day digit).

Load the number 100 into timing byte TEO, said number corresponding to Screen 2 being displayed for 2 seconds.

Move on to action 4.

Action 4

If the Enter key is depressed as detected at step 304, bit 5 of the keyboard image byte IC1 is at "zero", so terminate the date verification program and move on to message MN2.

If the contents of timing byte TEO is equal to zero as detected at step 306, then return to action 1 (looping message MN1), else return to action 4.

Message MP0 - Beginning-of-menu

The seven screens constituting this message are recalled below:

| Screen 1 | Which option do you want? | (1 second) |
| --- | --- | --- |
| Screen 2 | 1 - Machine state | (2 seconds) |
| Screen 3 | 2 - Auxiliary meters | (2 seconds) |
| Screen 4 | 3 - Change mode | (2 seconds) |
| Screen 5 | 4 - Change ceiling | (2 seconds) |
| Screen 6 | 5 - Change limit | (2 seconds) |
| Screen 7 | Select | (1 second) |

Figure 6:
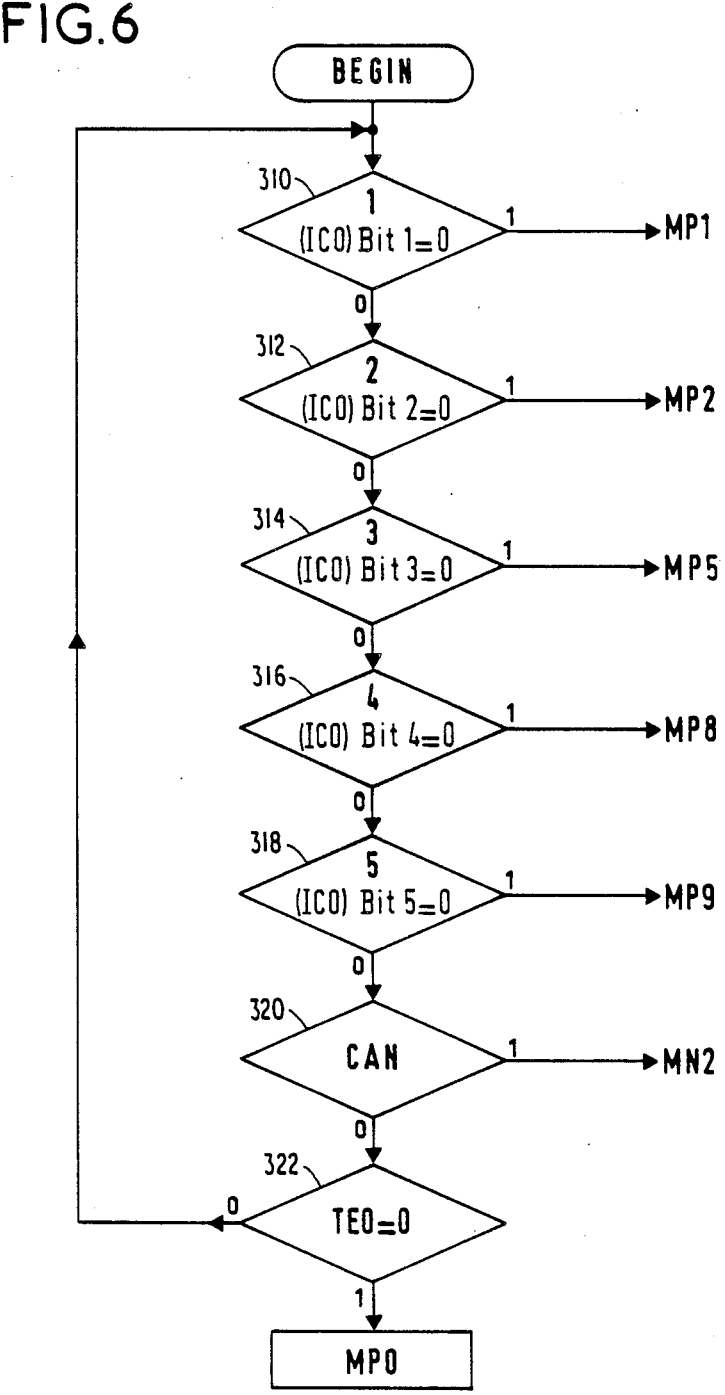

In order to simplify the beginning-of-menu program, a subprogram SPMPO is used whose flow chart is given in FIG. 6. This subprogram performs the following functions which correspond to steps 152-162 in FIGS. 8A and 8B but are performed repeatedly during the SPMPO program:

If key 1 of the keyboard is depressed (i.e. bit 1 of key image byte IC0 is at value "0"), then terminate the program at step 310 and move on to message MP1.

If key 2 is depressed (i.e. bit 2 of byte IC0 is at value "0"), then terminate the program at step 312 and move on to message MP2.

If key 3 is depressed (i.e. bit 3 of byte IC0 is at value "0"), then terminate the program at step 314 and move on to message MP5.

If key 4 is depressed (i.e. bit 4 of byte IC0 is at value "0"), then terminate the program at step 316 and move on to message MP8.

If key 5 is depressed (i.e. bit 5 of byte IC0 is at value "0"), then terminate the program at step 318 on to message MP9.

If the Cancel key is depressed (i.e. bit 7 of byte ITC1="0"), then at step 320 return to message MN2.

If the contents of timing byte TEO in the working memory is zero as detected at step 322, then move on to the following action in the beginning-of-menu program, else repeat the subprogram.

Figure 7:
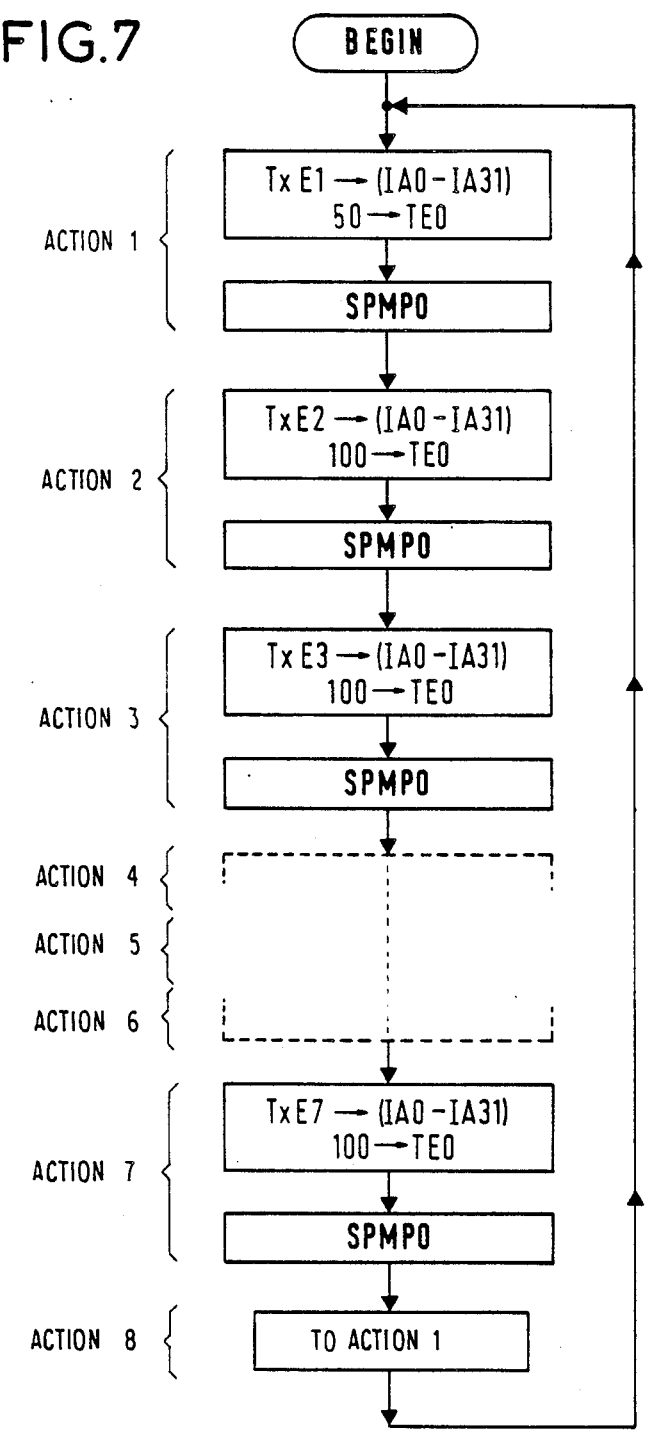

The beginning-of-menu program shown by the flow chart of FIG. 7 requires the following actions:

Action 1

Transfer the text of Screen 1 from the text memory into the display image IA of the working memory.

Load the number 50 into timing byte TEO of the working memory in order to display Screen 1 for 1 second.

Execute subprogram SPMPO.

Action 2

Transfer the text of Screen 2 frog the text memory into the display image IA of the working memory.

Load the number 100 into byte TEO in order to display Screen 2 for a period of 2 seconds.

Execute subprogram SPMPO.

Action 3

Transfer the text of Screen 3 from the text memory into the display image IA.

Load the number 100 into timing byte TEO.

Execute subprogram SPMPO.

Action 4

Transfer the text of Screen 4 from the text memory into display image IA.

Load the number 100 into timing byte TEO.

Execute subprogram SPMPO.

Action 5

Transfer the text of Screen 5 from the text memory into display image IA.

Load the number 100 into timing byte TEO.

Execute subprogram SPMPO.

Action 6

Transfer the text of Screen 6 from the text memory into display image IA.

Load the number 100 into timing byte TEO.

Execute subprogram SPMPO.

Action 7

Transfer the text of Screen 7 from the text memory into display image IA.

Load the number 50 into timing byte TEO.

Execute subprogram SPMPO.

Action 8

Loop to action 1.

Naturally there is a particular program for each of the messages MN2, MN3, ... and MP1, MP2, ... with the two above-described programs being given by way of example for messages MN1 and MPO.

In these two examples, the machine operates by scrolling from one screen to another, with each screen replacing another screen.

It is possible to scroll line-by-line by splitting up each message into a larger number of screens, with the program corresponding to the message being modified to take account of the number of screens.

There follows a description of how to obtain line-by-line scrolling using message MNI as an example.

Message MN1 is not modified in the text memory, but the program relating to this message is modified so as to provide three seconds instead of two; these three screens are as follows:

| Screen 1 | Verify state of setting wheels | (1 second + 2 beeps) |
| --- | --- | --- |
| Screen 1b | setting wheels Date = DD/MM/YY | (1 second) |
| Screen 2 | Date = DD/MM/YY | (2 seconds) |

-continued press Enter

Compared with scrolling screen-by-screen, it can be seen that scrolling line-by-line requires an additional screen to be created between two successive screens, in this case Screen 1b, with the first line of the additional screen reproducing the text of the last line of the preceding screen, and with the second line of the additional screen reproducing the text of the first line of the next screen. In the example of message MNI using three screens, the corresponding program uses actions 1, 3, and 4 of the above-described program without modification, and only the end of action 2 is modified, where the program now including two additional actions 2b and 2c.

The end of action 2 is modified as follows:

If the 1 second time-out has elapsed, so that the contents of timing byte TEO is zero, then move on to action 2b, else loop back to action 2.

Actions 2b and 2c are as follows:

Action 2b

Transfer 32 bytes from the text memory to the display image IA in the working memory. Transfer begins in the text memory at byte 16 of message MNI and continues to byte 47 inclusive; these bytes correspond to lines E1L2 and E2L1 of screens E1 and E2 as shown in FIG. 3, with these two lines constituting screen E1b.

Take the contents of year byte IHC0 from the working memory, convert into decimal and then into ASCII, and store the result in bytes IA29 and IA30 of the display image in the working memory.

Take the contents of month byte IHC1, convert it into decimal and then into ASCII, and store the result in byte IA26 and IA27 of the display image.

Take the contents of day byte IHC2, convert it into decimal and then into ASCII, and store the result in bytes IA23 and IA24 of the display image.

Load the number 50 into timing byte TEO.
Move onto action 2c.

Action 2c

If the enter key is depressed, terminate the program and move on to message MN2.

If the contents of timing byte TEO is zero, move on to action 3, else loop back to action 2c.

FIGS. 6, 6, 7, 8A, 8B, 9A, 9B, and 9C are flow charts as mentioned above.

In these figures, the digits 1, 2, ..., and the abbreviations ENT, CAN and M, together with the symbol *, all of which appear in the diamond shapes, respectively designate the digit keys, the Enter key (ENT), the Cancel key (CAN), the Menu key (M), and the Star key (*) of the keyboard. At the outputs from the diamonds, the digit 1 indicates "yes" and the digit 0 indicates "no".

In FIGS. 5, 6, and 7, the reference BEGIN marks the beginning.

In FIGS. 5 and 7, references action 1, action 2, etc., designate respective actions described above when describing the operation of the machine with reference to two examples: namely message MN1 whose flow chart is given in FIG. 5 and message MPO whose flow chart is given in FIG. 7.

In FIG. 8A, reference ON in the top rectangle means "switch the machine on", reference RD in the rectangle following message MN3 means "Read Digit", S>L in the diamond shape means "Is the keyed in value of the Stamp greater than the Limit?".

In FIG. 8B, S>C and S>Cr in the diamond shapes are tests to see whether the value of the Stamp is greater than the Ceiling or greater than the Credit; the letter E is a test for the presence of an envelope. References B and LB in diamond shapes relate to "Burst" and "Limited Burst". In the rectangles, the mentions "Frank. Prog." mean "Franking Program".

In FIGS. 9A and 9B, references RD in rectangles mean "Read Digit".

The various programs relating to the messages are in the program memory, and it is possible to have all of the programs organized for screen-by-screen scrolling or for line-by-line scrolling, or to have some message programs provided for screen-by-screen scrolling while other message programs are provided for line-by-line scrolling. Regardless of the type of scrolling used, the texts of the messages in the text memory are the same, since the extra screens required by line-by-line scrolling are built up by the program relating to the message, with said program being provided for that type of scrolling. In line-by-line scrolling, the first line of each screen from the second screen onwards reproduces the second line of the preceding screen, assuming that the screens are two lines long.

When the screens are L lines long, then each screen from the second screen on reproduces the (L−1) last lines of the preceding screen. The program is then provided to cope with L-line screens and with line-by-line scrolling, with the program controlling the reading of the L first lines of the message, and then the reading of the next L lines with each read operation being shifted by one line relative to the preceding read operation. The last screen has the L last lines of the message.

In the example described with reference to the accompanying figures, it has been assumed that the display is of the alphanumeric type. If a graphics type display is used, it is possible for scrolling to be not only screen-by-screen or line-by-line as described above, but also continuous, slow, and vertical, in which case the line of text at the top of the display disappears progressively while a new line of text appears progressively at the bottom of the screen. Such a graphic display also makes it possible to modulate the sizes of the displayed characters.

In the description of the messages, the display times of the screens are given by way of example, and there times are fixed when the programs are loaded in the program memory. The same applies to the various times relating to the audible beeps. It would be possible to have a greater number of screens associated with an audible alarm than the number mentioned in the description.

The invention is applicable to any franking machine, including automatic franking machines in which envelopes are not hand-fed one-by-one, but are presented to the machine automatically.

I claim:

1. A franking machine comprising a keyboard including ten digit keys, a display, a calendar clock, a microprocessor, a program memory, a text memory, and a working memory interconnected by a bus, wherein:
   the display is suitable for displaying a text of L lines of N alphanumeric characters;
   the keyboard further includes an Enter key, a Cancel key, a Star key, and a Menu key;

a first set of messages for normal franking operations and a second set of messages for special operations are stored in the text memory;

the second set of messages is accessible by means of the Menu key;

each message in the first and second sets of messages is split into screens each comprising a number L of lines and N of alphanumeric characters equal to the number L of lines and N of characters that can be displayed by the display, with the screens of a message being displayed in succession;

each screen is fully displayed on the display after being transferred from the text memory into the working memory; and the program memory contains as many programs as there are messages, with each program relating to one of the messages, with a message being displayed by running the corresponding program, with the first set of messages guiding an operator by indicating the next operation to be performed until a franking operation is achieved, and with the second set of messages guiding the operator in performing any special operation by means of messages each of which consists in a sequence of options which, on being selected, lead to corresponding other messages, and so on until the special operation is achieved.

2. A franking machine according to claim 1, including a score of auxiliary meters, each auxiliary meter comprising a money meter and a piece counter, and occupying memory space in the working memory.

3. A franking machine according to claim 1, wherein the keyboard includes two arrow keys, and wherein each arrow key, on being depressed, causes screen scrolling to stop, with one of the keys, on being released, causing the next screen to be displayed and the other arrow key, on being released, causing the preceding screen to be displayed.

4. A franking machine according to claim 1, wherein the program relating to a message comprising at least 2L lines builds up screens of L lines each, with each screen from the second screen onwards reproducing the L−1 last lines of the preceding screen, thereby obtaining line-by-line scrolling when said screens are displayed in succession.

5. A franking machine according to claim 1, wherein the display is an alphanumeric display.

6. A franking machine according to claim 1, wherein the display is a graphic display.

7. A franking machine according to claim 1, wherein the working memory includes a first 2-byte temporary keyboard image zone, a second 2-byte keyboard image zone, a third zone for the image to be displayed comprising a number of bytes equal to the product of the number L of lines multiplied by the number N of characters per line, said third zone storing one screen of a message transferred from the text memory into the working memory, a 6-byte fourth zone for a calendar clock image giving indications specifying the year, the month, the day, the hour, the minute, and the second, a fifth 1-byte zone for screen timing giving the display time of the screen stored in the third zone, said display time depending on the amount of screen text and being loaded by each program individually for each message, wherein the second and third zones are read cyclically during the running of each program relating to a message, and wherein the fourth zone is read during the running of programs relating to messages solely when said messages include an indication of the date and the time, which indication is transferred into the display image in order to be displayed.

8. A franking machine according to claim 7, wherein the program memory includes specific programs as follows: a keyboard acquisition program for reading the state of each key, storing said state in the temporary keyboard image, and then transferring the temporary keyboard image to the keyboard image when the temporary keyboard image remains identical for a period of time fixed by the acquisition program, which program runs automatically in cyclic manner; a display program which runs automatically in cyclic manner to take each byte from the display image and apply it to the display for display purposes; a calendar clock acquisition program which runs automatically in cyclic manner to read the state of six counters relating respectively to the year, the month, the day, the hour, the minute, and the second, and to store the states of these counters in the calendar clock image; and a timing program which runs automatically in cyclic manner to read the screen timing byte and to decrement its value by unity each time it reads it.

9. A franking machine according to claim 1, wherein the first set of messages includes a franking-or-menu message, a message for keying in the franking value, a message indicating a confirmed stamp value, and wherein the franking-or-menu message appears after a franking operation and after the Cancel key has been depressed.

10. A franking machine according to claim 9, wherein the first set of messages also includes an out-of-credit warning message which appears when the keyed-in franking value exceeds an amount of credit available for said machine, and wherein said franking-or-menu message is displayed in response to depression of said Cancel key when said out-of-credit warning message is being displayed.

11. A franking machine according to claim 9, wherein the first set of messages also includes a warning message for verifying the date when the machine is not fitted with automatic dating, said varying message appearing automatically and solely on the first occasion that the machine is powered up in the day, the franking-or-menu message appearing after the date verification message has been confirmed and whenever the machine is powered up without a change of date.

12. A franking machine according to claim 11, wherein the second set of messages includes a beginning-of-menu message which appears when the operator presses the Menu key, said beginning-of-menu message including options each of which corresponds to a message, with each option being identified by a digit corresponding to one of the keys of the keyboard, and the messages corresponding to the options including "machine state" and "auxiliary meters", with the "auxiliary meters" message including a first option corresponding to an auxiliary meter select message, and second, third, and fourth options corresponding to messages confirming a selected state for the previously selected auxiliary meter, said states being reset-to-zero, stop, and start, with the selected state being displayed in the selected state confirmation message, and with the selected meter being put into the selected state after said selected state has been confirmed.

* * * * *